United States Patent
Zhang

(10) Patent No.: US 10,473,838 B2
(45) Date of Patent: Nov. 12, 2019

(54) COLOR FILTER SUBSTRATE AND MANUFACTURING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Minghui Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 6 days.

(21) Appl. No.: 15/538,867

(22) PCT Filed: Apr. 27, 2016

(86) PCT No.: PCT/CN2016/080302
§ 371 (c)(1),
(2) Date: Jun. 22, 2017

(87) PCT Pub. No.: WO2017/147991
PCT Pub. Date: Sep. 8, 2017

(65) Prior Publication Data
US 2018/0106935 A1   Apr. 19, 2018

(30) Foreign Application Priority Data
Feb. 29, 2016   (CN) .......................... 2016 1 0112444

(51) Int. Cl.
*G02F 1/1335* (2006.01)
*G02B 5/28* (2006.01)
(Continued)

(52) U.S. Cl.
CPC .............. *G02B 5/286* (2013.01); *G02B 1/113* (2013.01); *G02B 5/201* (2013.01); *G02F 1/113* (2013.01);
(Continued)

(58) Field of Classification Search
CPC ........... H01L 27/14621; H01L 27/3206; H01L 27/3211; G02F 1/133502; G02F 1/133514;
(Continued)

(56) References Cited

U.S. PATENT DOCUMENTS

2008/0130122 A1   6/2008   Egi et al.
2008/0151152 A1*  6/2008   Yang ................. G02F 1/133502
                                                    349/106
(Continued)

FOREIGN PATENT DOCUMENTS

CN   101299106 A   11/2008
CN   102879948 A   1/2013
(Continued)

OTHER PUBLICATIONS

International Search Report and Written Opinion dated Nov. 25, 2016; PCT/CN2016/080302.
(Continued)

*Primary Examiner* — Thoi V Duong

(57) ABSTRACT

A color filter substrate and a manufacturing method thereof, and a display device are disclosed. The color filter substrate includes: a base substrate, a plurality of color filter units of different colors arranged on a side of the base substrate, and a light anti-reflection layer arranged on the base substrate and on a light emergent side of the color filter units. The light anti-reflection layer is capable of increasing a light transmission rate of at least one color filter unit. The effect of improving the light transmission rate can be realized.

10 Claims, 5 Drawing Sheets

(51) Int. Cl.
*G02F 1/11* (2006.01)
*G02F 1/13363* (2006.01)
*G02B 1/113* (2015.01)
*G02B 5/20* (2006.01)

(52) U.S. Cl.
CPC ........ *G02F 1/1335* (2013.01); *G02F 1/13363* (2013.01); *G02F 1/133502* (2013.01); *G02F 1/133514* (2013.01)

(58) Field of Classification Search
CPC ............ G02F 1/133528; G02F 1/1335; G02F 2201/50; G02F 2201/38; G02F 2001/133562; G02F 1/113; G02F 1/13363; G02B 5/286; G02B 5/201; G02B 1/113
See application file for complete search history.

(56) References Cited

U.S. PATENT DOCUMENTS

| | | | | |
|---|---|---|---|---|
| 2012/0249928 | A1* | 10/2012 | Kaihoko | G02B 5/3083 349/69 |
| 2014/0160396 | A1 | 6/2014 | Chung et al. | |
| 2015/0293403 | A1 | 10/2015 | Lee et al. | |
| 2018/0052355 | A1 | 2/2018 | Wang | |

FOREIGN PATENT DOCUMENTS

| | | |
|---|---|---|
| CN | 202837750 U | 3/2013 |
| CN | 203232226 U | 10/2013 |
| CN | 203616558 U | 5/2014 |
| CN | 105223724 A | 1/2016 |
| CN | 105487280 A | 4/2016 |
| JP | 2002-350602 A | 12/2002 |

OTHER PUBLICATIONS

The Second Chinese Office Action dated Oct. 31, 2018; Appln. No. 201610112444.3.

* cited by examiner

COLOR FILTER SUBSTRATE AND MANUFACTURING METHOD THEREOF, AND DISPLAY DEVICE

TECHNICAL FIELD

Embodiments of the present disclosure relate to a color filter substrate and a manufacturing method thereof, and a display device.

BACKGROUND

At present, a liquid crystal display (LCD) generally uses a white light emitting diode (LED) as a backlight which coordinates with a RGB (Red, Green, and Blue) color filter to realize a pixel coloring function, and the color filter work to filter corresponding color lights in the white light. However, this approach has the following defects:

(1) Because R, G, and B color blocks only respectively allow light corresponding to red, green and blue spectra in white light to pass through, there is loss of the light to a certain degree when it transmits. In order to facilitate understanding, please refer to FIG. 1 (FIG. 1 is a schematic diagram of principle of optical loss). As illustrated in FIG. 1, since there is a refractive index difference between photo resist and glass, when light transmits through an interface between the two, partial light will be reflected to form reflected light 1, and there will be a second time of light reflection on the boundary between the glass and air to form reflected light 2. The reflected light 1 and the reflected light 2 are the main cause for optical loss, while reflected light formed through other light reflection (for example, reflected light 3) may be ignored. It is seen that the light loss shown by FIG. 1 will surely decrease a light transmission rate of an incident light.

(2) When light transmits a color filter (CF), selectivity is comparatively low, which will decrease color gamut of the light.

SUMMARY

An aspect of the present disclosure provides a color filter substrate, comprising: a base substrate, a plurality of color filter units of different colors arranged on a side of the base substrate, and a light anti-reflection layer arranged on the base substrate and on a light emergent side of the color filter units, the light anti-reflection layer being capable of increasing a light transmission rate of at least one color filter unit.

For example, the color filter substrate is an opposed substrate that cell-assembled to provide a display device with an array substrate; and the light anti-reflection layer is arranged between the color filter units and the base substrate.

For example, the color filter substrate is an opposed substrate that cell-assembled to provide a display device with an array substrate; and the light anti-reflection layer is arranged on the other side of the base substrate.

For example, the color filter substrate is an array substrate with a color filter integrated thereon; and the light anti-reflection layer is arranged on a side of the color filter away from the base substrate.

For example, a position where the light anti-reflection layer is arranged on the base substrate corresponds to a position where at least one color filter unit is arranged on the base substrate.

For example, a thickness of the light anti-reflection layer is relevant to a wavelength of color light corresponding to at least one color filter unit.

For example, the light anti-reflection layer includes a plurality of light anti-reflection units in one-to-one correspondence with the color filter units, and a thickness of each light anti-reflection unit is $n\lambda_{light}/4$, where n is an odd number, and $\lambda_{light}$ is a wavelength of the color light corresponding to the color filter unit corresponding to the light anti-reflection unit.

For example, the color filter units include a red color filter unit, the light anti-reflection layer includes a red light anti-reflection unit corresponding to the red color filter unit, and a thickness of the red light anti-reflection unit is $n\lambda_{red}/4$, where n is an odd number, $\lambda_{red}$ is a wavelength of red light, and a range of $\lambda_{red}$ is greater than or equal to 620 nm and less than or equal to 760 nm.

For example, the thickness of the red light anti-reflection unit is less than or equal to a thickness of the red color filter unit.

For example, the thickness of the red light anti-reflection unit is n*690 nm/4.

For example, the color filter units include a green color filter unit, the light anti-reflection layer includes a green light anti-reflection unit corresponding to the green color filter unit, and a thickness of the green light anti-reflection unit is $n\mu_{green}/4$, where n is an odd number, $\lambda_{green}$ is a wavelength of green light, and a range of $\lambda_{green}$ is greater than or equal to 505 nm and less than or equal to 566 nm.

For example, the thickness of the green light anti-reflection unit is less than or equal to a thickness of the green color filter unit.

For example, the thickness of the green light anti-reflection unit is n*535.5 nm/4.

For example, the color filter units include a blue color filter unit, the light anti-reflection layer includes a blue light anti-reflection unit corresponding to the blue color filter unit, and a thickness of the blue light anti-reflection unit is $n\lambda_{blue}/4$, where n is an odd number, $\lambda_{blue}$ is a wavelength of blue light, and a range of $\lambda_{blue}$ is greater than or equal to 460 nm and less than or equal to 475 nm.

For example, the thickness of the blue light anti-reflection unit is less than or equal to a thickness of the blue color filter unit.

For example, the thickness of the blue light anti-reflection unit is n*467.5 nm/4.

For example, a material of the light anti-reflection layer includes: photo resist.

Another aspect of the present disclosure provides a display device comprising any one of the above-described color filter substrates.

Still another aspect of the manufacturing method for a color filter substrate, comprising: forming a plurality of color filter units of different colors on a side of a base substrate; and forming a light anti-reflection layer on the base substrate and on a light emergent side of the color filter units, the light anti-reflection layer being capable of increasing a light transmission rate of at least one color filter unit.

For example, a thickness of the light anti-reflection layer is relevant to a wavelength of a color light corresponding to at least one color filter unit, to increase a light transmission rate of the color filter unit.

For example, the color filter substrate is an opposed substrate that cell-assembled to provide a display device with an array substrate; and forming of the light anti-reflection layer includes: forming the light anti-reflection layer between the color filter units and the base substrate.

For example, the color filter substrate is an opposed substrate that cell-assembled to provide a display device with an array substrate; and forming of the light anti-reflection layer includes: forming the light anti-reflection layer on the other side of the base substrate.

For example, the color filter substrate is an array substrate with a color filter integrated thereon; and forming of the light anti-reflection layer includes: forming the light anti-reflection layer on a side of the color filter apart from the base substrate.

For example, the color filter units include: a red filter unit, a green filter unit and a blue filter unit; the light anti-reflection layer includes: a red light anti-reflection unit, a green light anti-reflection unit and a blue light anti-reflection unit, the red light anti-reflection unit corresponds to the red filter unit, the green light anti-reflection unit corresponds to the green filter unit, and the blue light anti-reflection unit corresponds to the blue filter unit.

For example, forming of the light anti-reflection layer includes: respectively performing three masking processes, so as to form the red light anti-reflection unit on a position corresponding to the red filter unit on the base substrate, form the green light anti-reflection unit on a position corresponding to the green filter unit on the base substrate, and form the blue light anti-reflection unit on a position corresponding to the blue filter unit on the base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
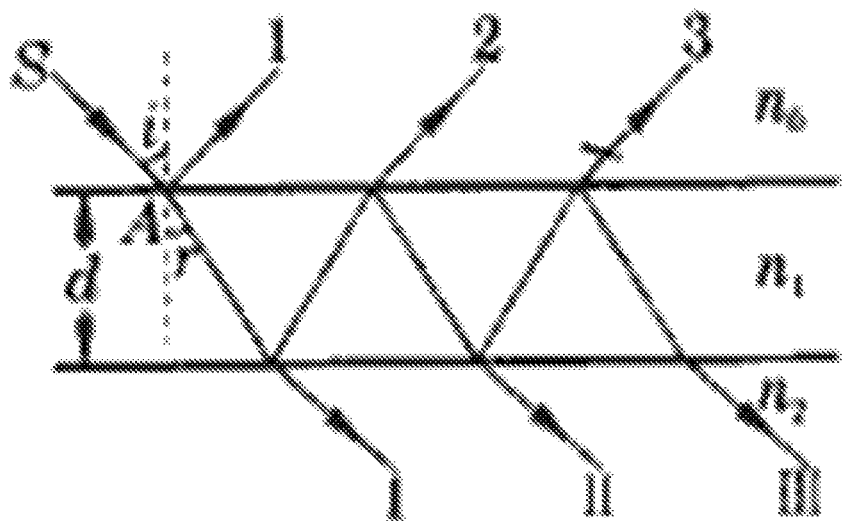
FIG. 1 is a schematic diagram of principle of optical loss.
Figure 2:
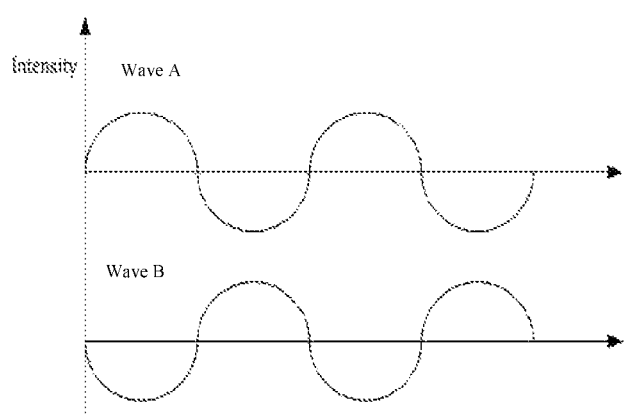
FIG. 2 is a schematic diagram of a phase of thin film anti-reflection in accordance with an embodiment of the present disclosure.

Embodiments of the present disclosure are realized based on a light anti-reflection theory. First of all, with reference to FIG. 2 (FIG. 2 is a schematic diagram of a phase of thin film anti-reflection in accordance with an embodiment of the present disclosure), the light anti-reflection theory is introduced as follows:

When light enters a thin film from air and into glass from a thin film, i.e., when light enters an optically denser medium from an optically thinner medium, two times of light reflection on an interface between the air and the thin film and on an interface between the thin film and the glass will cause light loss of incident light. When a film thickness is designed as ¼ of a wavelength of a certain type of light, the reflected light 1 and the reflected light 2 in FIG. 1 will generate an effect of offsetting each other due to a phase difference just being $\pi/2$; because of conservation of energy, transmitted light I and transmitted light II will have a complementary effect, resulting in the objective of enhancing transmission rate.

On such a basis, an embodiment of the present disclosure provides a color filter substrate, the color filter substrate comprising: a base substrate, a plurality of color filter units of different colors arranged on a side of the base substrate, and a light anti-reflection layer arranged on the base substrate and on a light emergent side of the color filter units; the light anti-reflection layer is capable of increasing a light transmission rate of at least one color filter unit.

Because the function of a light anti-reflection layer is to increase the light transmission rate of one or more color filter units, as long as the light anti-reflection layer is arranged on a light emergent side of a color filter unit, whose light transmission rate needs to be increased, the objective of light anti-reflection can be achieved.

Figure 6A:
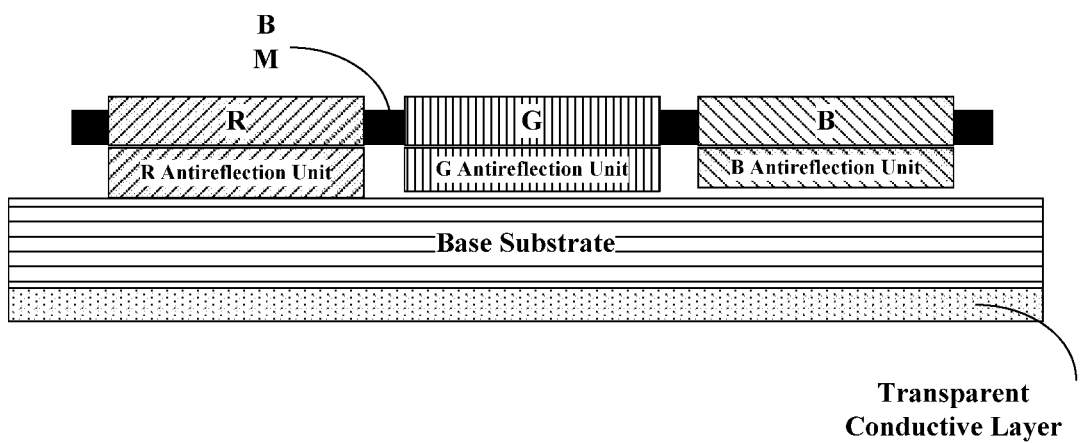
FIG. 6A is a first sectional structural schematic diagram of the color filter substrate in accordance with an embodiment of the present disclosure.
Figure 6B:
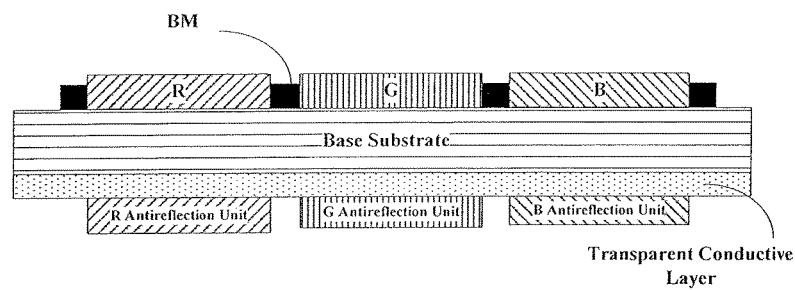
FIG. 6B is a second sectional structural schematic diagram of the color filter substrate in accordance with the embodiment of the present disclosure.

In an embodiment of the present disclosure, for example, the color filter substrate is an opposed substrate that cell-assembled to provide a display device with an array substrate. In this case, two manners of arranging the light anti-reflection layer can be adopted: (1) the light anti-reflection layer is arranged between the color filter units and the base substrate, as illustrated in FIG. 6A; (2) the light anti-reflection layer is arranged on the other side of the base substrate, as illustrated in FIG. 6B.

In a practical application, whichever of the two arrangement manners is used, the light transmission rate of the color filter units can be increased; and the light anti-reflection layer may correspond to one or more color filter units of the color filter substrate for increasing light transmission rate of color(s) corresponding to the filter unit(s). Regarding the manner (2), i.e., the process of arranging a light anti-reflection layer on an outer surface of the color filter substrate (the side other than the side of the base substrate provided with filter units) is comparatively not difficult and it is easier to be molded.

Figure 6C:
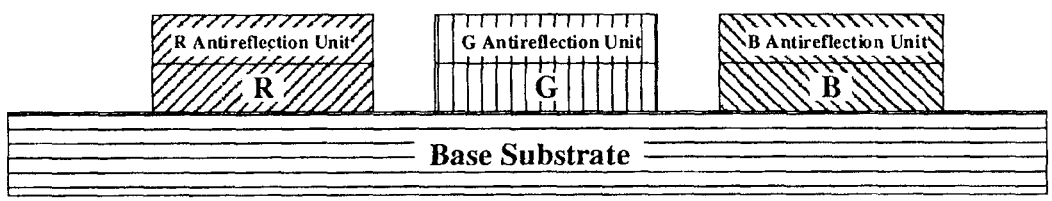
FIG. 6C is a second sectional structural schematic diagram of the color filter substrate in accordance with the embodiment of the present disclosure.

In the embodiment of the present disclosure, for example, the color filter substrate is an array substrate with a color filter integrated thereon. In this case, the light anti-reflection layer is arranged on a side of the color filter away from the base substrate, as illustrated in FIG. 6C.

In the embodiment of the present disclosure, a position where the light anti-reflection layer is arranged on the base substrate corresponds to a position where at least one color filter unit is arranged on the base substrate. Besides, a thickness of the light anti-reflection layer is relevant to a wavelength of a color light corresponding to at least one color filter unit.

In a practical application, take arranging three color filter units, a red color filter unit, a green color filter unit and a blue color filter unit, on the color filter substrate for example, in order to increase the transmission rate of light of the corresponding color, a light anti-reflection layer can be arranged correspondingly. One or two types of light, or the entire three types of light, can be anti-reflected (increasing transmission); if only one type of light (e.g., the red light) is anti-reflected, a red light anti-reflection unit can be arranged on the position on the base substrate corresponding to the red color filter unit; if three types of light (red, green, and blue) need to be anti-reflected, a red light anti-reflection unit, a green anti-reflection unit and a blue anti-reflection unit shall be arranged on positions respectively corresponding to the red filter unit, green filter unit and blue filter unit on the base substrate. That is to say, the light anti-reflection layer may comprise a plurality of light anti-reflection units in one-to-one correspondence with the color filter units.

It should be explained that there has to be a certain relevance respectively among thicknesses of the three types of light anti-reflection units and wavelengths of the three types of color light. For example, a thickness of each light anti-reflection unit is $n\lambda_{light}/4$, where n is an odd number, and $\lambda_{light}$ is a wavelength of the color light corresponding to the color filter unit corresponding to the light anti-reflection unit. Please see FIG. 2 for reference. That is to say, if the thickness of a light anti-reflection unit and the Wavelength of the corresponding color light satisfy the phase (i.e. the aforementioned relevance) relationship shown in FIG. 2, the transmission rate of the corresponding color light may be increased.

The arrangement of the color filter units and their corresponding anti-reflection units will be described in the following.

(1) When the color filter units comprise a red color filter unit, the light anti-reflection layer comprises a red light anti-reflection unit corresponding to the red color filter unit, and a thickness of the red light anti-reflection unit is $n\lambda_{red}/4$, where n is an odd number, $\lambda_{red}$ is a wavelength of red light, and the range of $\lambda_{red}$ is greater than or equal to 620 nm and less than or equal to 760 nm.

In order to decrease the effect of adding the red light anti-reflection unit on the thickness of the color filter substrate, the thickness of the red light anti-reflection unit may be set as less than or equal to a thickness of the red color filter unit, on the basis of which the thickness of the red light anti-reflection unit may be set as n*690 nm/4.

(2) When the color filter units comprise a green color filter unit, the light anti-reflection layer comprises a green light anti-reflection unit corresponding to the green color filter unit, and a thickness of the green light anti-reflection unit is $n\lambda_{green}/4$, where n is an odd number, $\lambda_{green}$ is a wavelength of green light, and the range of $\lambda_{green}$ is greater than or equal to 505 nm and less than or equal to 566 nm.

In order to decrease the effect of adding the green light anti-reflection unit on the thickness of the color filter substrate, the thickness of the green light anti-reflection unit may be set as less than or equal to a thickness of the green color filter unit, on the basis of which the thickness of the green light anti-reflection unit may be set as n*535.5 nm/4.

(3) When the color filter units comprise a blue color filter unit, the light anti-reflection layer comprises a blue light anti-reflection unit corresponding to the blue color filter unit, and a thickness of the blue light anti-reflection unit is $n\lambda_{blue}/4$, where n is an odd number, $\lambda_{blue}$ is a wavelength of blue light, and the range of $\lambda_{blue}$ is greater than or equal to 460 nm and less than or equal to 475 nm.

In order to decrease the effect of adding the blue light anti-reflection unit on the thickness of the color filter substrate, the thickness of the blue light anti-reflection unit may be set as less than or equal to a thickness of the blue color filter unit, on the basis of which the thickness of the blue light anti-reflection unit may be set as n*467.5 nm/4.

Of course, the aforementioned three situations only concern arrangement of light anti-reflection units of corresponding colors in accordance with the types of the color filter units. In a practical application, generally any color filter substrate has color filter units of three colors, i.e., red, green and blue, but a light anti-reflection unit may still be arranged optionally; for example, if it is not pursued that the entire light transmission rate of the color filter substrate be increased, a light anti-reflection unit of any one of the colors of red, green and blue can be arranged (any one of a red light anti-reflection unit, a green light anti-reflection unit and a blue light anti-reflection unit), or light anti-reflection units of any two of the three colors, red, green and blue can be arranged (any two of a red light anti-reflection unit, a green light anti-reflection unit and a blue light anti-reflection unit). Of course, in order to increase the light transmission rate of the color filter substrate, it can be arranged that all of the three, i.e., a red light anti-reflection unit, a green light anti-reflection unit and a blue light anti-reflection unit, are provided.

It shall be noted that based on the aforementioned relevance between the thickness of a light anti-reflection unit and the wavelength of a color light, the thicknesses of a red light anti-reflection unit, a green light anti-reflection unit and a blue light anti-reflection unit are different from each other. Therefore, when forming these light anti-reflection units, they are manufactured respectively by a masking process.

It should be explained that the sizes and proportions shown in the drawings do not represent real sizes and proportions.

Figure 3:
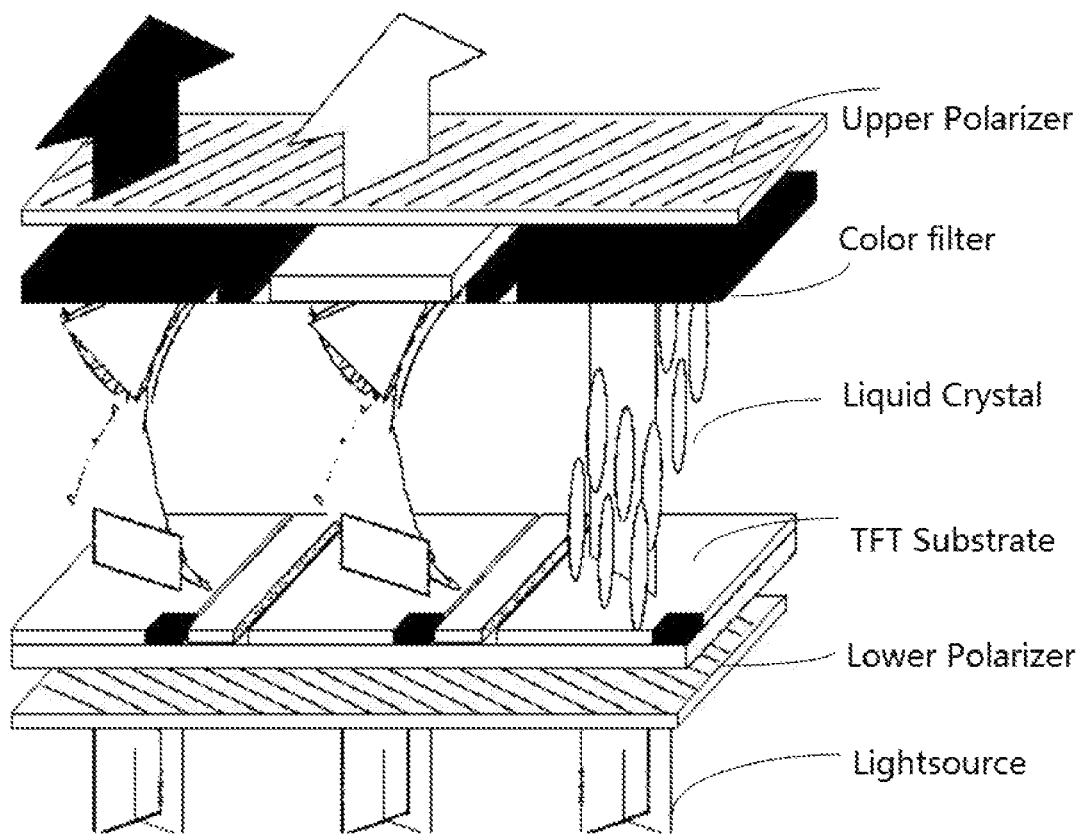
FIG. 3 is a stereoscopic structural schematic diagram of a color filter substrate in accordance with a technology.
Figure 4:
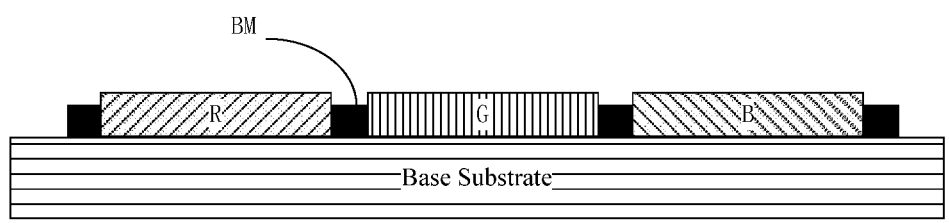
FIG. 4 is a sectional structural schematic diagram of the color filter substrate in accordance with a technology.
Figure 5:
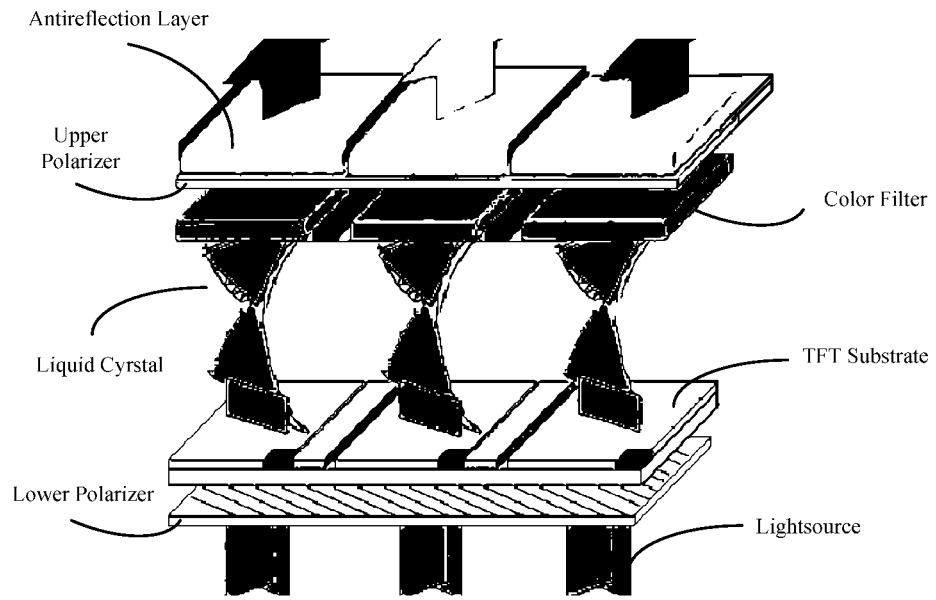
FIG. 5 is a stereoscopic structural schematic diagram of the color filter substrate in accordance with an embodiment of the present disclosure.

In comparison, please refer to FIGS. 3 to 6B. FIG. 3 is a stereoscopic structural schematic diagram of a color filter substrate in accordance with a technology, while FIG. 4 is a sectional structural schematic diagram of the color filter substrate in accordance with a technology. Compared with FIG. 3 and FIG. 4, it is seen from FIG. 5 (FIG. 5 is a stereoscopic structural schematic diagram of the color filter substrate in accordance with an embodiment of the present disclosure) that a light anti-reflection layer (of course, only one or two types of light anti-reflection units or all types can be arranged) is arranged on the surface of the base substrate (i.e., the side other than the side of arranged with color filters), and FIG. 5 shows using the aforementioned manner (2) to set the light anti-reflection layer. FIG. 6A is a sectional structural schematic diagram of the color filter substrate by using the aforementioned manner (1), and FIG. 6B is a sectional structural schematic diagram of the color filter substrate by using the aforementioned manner (2). It is seen from FIG. 6A and FIG. 6B (FIG. 6A is a sectional structural schematic diagram One of the color filter substrate in accordance with the embodiment of the present disclosure; FIG. 6B is a sectional structural schematic diagram Two of the color filter substrate in accordance with the embodiment of the present disclosure) that light anti-reflection units of three colors KGB are arranged (the thicknesses of the three light anti-reflection units are different from each other, depending on the wavelengths of light of the three colors RGB).

In a practical application, formation of a light anti-reflection layer can be achieved by a patterning process which includes exposure, development and etching and the like. It shall be indicated that the three types of light anti-reflection units in FIGS. 5, 6A and 6B are respectively formed with the three types of color filter units basically by the same specifications on the completely corresponding positions, however, in a practical application, the specifications (sizes) of the three light anti-reflection units may be adjusted in accordance with needs for light anti-reflection, and the corresponding positions may also be partially corresponding, which is not limited in the embodiment of the present disclosure.

For example, materials of the light anti-reflection layer may be multiple transparent materials that can be easily molded. For example, photo resist that has good light transmission and reasonable cost can be used. In a case where photo resist is used to form a light anti-reflection layer, patterning of a light anti-reflection layer can be completed through an exposure and developing process without etching, simplifying the manufacturing process.

In FIGS. 6A and 6B, the base substrate is provided with, for example, a transparent conductive layer like an ITO layer, the structure of which is especially applicable to an IPS display mode. The function of the transparent conductive layer is mainly to prevent a liquid crystal cell from being negatively affected by static.

On the basis of the aforementioned color filter substrate, an embodiment of the present disclosure further provides a display device, and an improvement to the display device lies in application of the aforementioned color filter substrate. On such basis, the display device has a positive effect of increasing the light transmission rate of the aforementioned color filter substrate.

For example, a display device in accordance with an embodiment of the present disclosure can be any product or component that has a display function, such as a telephone, a tablet, a television, a display, a laptop, a digital photo frame or a navigator, which will not be limited in the present disclosure.

Figure 7:
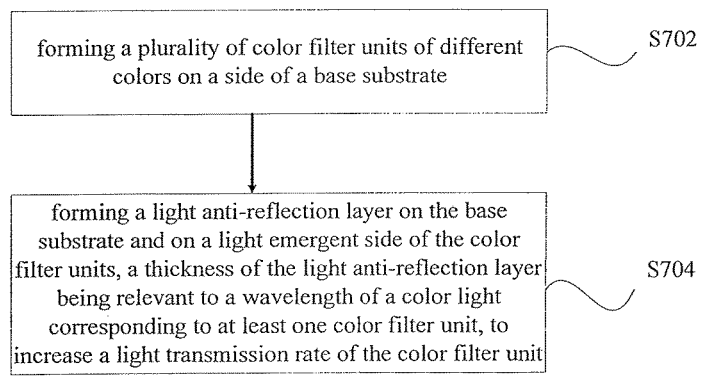
FIG. 7 is a flow chart of manufacturing a color filter substrate in accordance with an embodiment of the present disclosure.

In response to the aforementioned color filter substrate, an embodiment of the present disclosure further provides a manufacturing method for a color filter substrate. FIG. 7 is a manufacturing method flow chart of the color filter substrate in accordance with the embodiment of the present disclosure. As illustrated in FIG. 7, the method comprises the following operations (steps S702 to S704):

Step S702: forming a plurality of color filter units of different colors on a side of a base substrate; and Step S704: forming a light anti-reflection layer on the base substrate and on a light emergent side of the color filter units, a thickness of the light anti-reflection layer being relevant to a wavelength of a color light corresponding to at least one color filter unit, to increase a light transmission rate of the color filter unit.

The arrangement manner of the light anti-reflection layer has been specified previously and will not be repeated.

For example, the color filter units may comprise: a red filter unit, a green filter unit and a blue filter unit. Correspondingly, the light anti-reflection layer may comprise: a red light anti-reflection unit, a green light anti-reflection unit and a blue light anti-reflection unit, wherein the red light anti-reflection unit corresponds to the red filter unit, the green light anti-reflection unit corresponds to the green filter unit, and the blue light anti-reflection unit corresponds to the blue filter unit.

For example, the step of forming the light anti-reflection layer may be realized in the following manner: by respectively performing three masking processes, forming the red light anti-reflection unit on a position corresponding to the red filter unit on the base substrate, forming the green light anti-reflection unit on a position corresponding to the green filter unit on the base substrate, and forming the blue light anti-reflection unit on a position corresponding to the blue filter unit on the base substrate.

It is certain that the formation order of the red light anti-reflection unit, the green light anti-reflection unit and the blue light anti-reflection unit is not limited.

At least an embodiment of the present disclosure, i.e., forming a light anti-reflection layer on the color filter substrate and achieving the objective of reducing loss of incident light by using the light anti-reflection layer, may increase the transmission rate of the R, G, B color lights while promoting color gamut.

The foregoing embodiments merely are exemplary embodiments of the disclosure, and not intended to define the scope of the disclosure, and the scope of the disclosure is determined by the appended claims.

The present application claims the priority of Chinese Patent Application No. 201610112444.3 filed on Feb. 29, 2016, the present disclosure of which is incorporated herein by reference in its entirety as part of the present application.

What is claimed is:

1. A color filter substrate, comprising:
a base substrate,
a plurality of color filter units of different colors arranged on a side of the base substrate, and
a light anti-reflection layer arranged on the base substrate and on a light emergent side of the color filter units, the light anti-reflection layer being capable of increasing a light transmission rate of at least one color filter unit,
wherein a position where the light anti-reflection layer is arranged on the base substrate corresponds to a position where at least one color filter unit is arranged on the base substrate, a thickness of the light anti-reflection layer is relevant to a wavelength of color light corresponding to at least one color filter unit, and the light anti-reflection layer includes a plurality of light anti-reflection units in one-to-one correspondence with the color filter units,
a thickness of each light anti-reflection unit is $n\lambda_{light}/4$, where n is an odd number, and $\lambda_{light}$ is a wavelength of the color light corresponding to the color filter unit corresponding to the light anti-reflection unit,
the color filter substrate is an array substrate with a color filter integrated thereon; and
the light anti-reflection layer is arranged on a side of the color filter away from the base substrate.

2. The color filter substrate according to claim 1, wherein the color filter units include a red color filter unit, the light anti-reflection layer includes a red light anti-reflection unit corresponding to the red color filter unit, and
a thickness of the red light anti-reflection unit is $n\lambda_{red}/4$, where n is an odd number, $\lambda_{red}$ is a wavelength of red light, and a range of $\lambda_{red}$ is greater than or equal to 620 nm and less than or equal to 760 nm.

3. The color filter substrate according to claim 1, wherein the color filter units include a green color filter unit, the light anti-reflection layer includes a green light anti-reflection unit corresponding to the green color filter unit, and
a thickness of the green light anti-reflection unit is $n\lambda_{green}/4$, where n is an odd number, $\lambda_{green}$ is a wavelength of green light, and a range of $\lambda_{green}$ is greater than or equal to 505 nm and less than or equal to 566 nm.

4. The color filter substrate according to claim 1, wherein the color filter units include a blue color filter unit, the light anti-reflection layer includes a blue light anti-reflection unit corresponding to the blue color filter unit, and a thickness of the blue light anti-reflection unit is $n\lambda_{blue}/4$, where n is an odd number, $\lambda_{blue}$ is a wavelength of blue light, and a range of $\lambda_{blue}$ is greater than or equal to 460 nm and less than or equal to 475 nm.

5. The color filter substrate according to claim 1, wherein the thickness of the blue light anti-reflection unit is less than or equal to a thickness of the blue color filter unit.

6. The color filter substrate according to claim 1, wherein a material of the light anti-reflection layer includes: photo resist.

7. A display device, comprising: the color filter substrate according to claim 1.

8. A manufacturing method for a color filter substrate, comprising:

forming a plurality of color filter units of different colors on a side of a base substrate; and forming a light anti-reflection layer on the base substrate and on a light emergent side of the color filter units, the light anti-reflection layer being capable of increasing a light transmission rate of at least one color filter unit, wherein the light anti-reflection layer includes a plurality of light anti-reflection units in one-to-one correspondence with the color filter units, a thickness of each light anti-reflection unit is $n\lambda_{light}/4$, where n is an odd number, and $\lambda_{light}$ is a wavelength of the color light corresponding to the color filter unit corresponding to the light anti-reflection unit, the color filter substrate is an array substrate with a color filter integrated thereon; and forming of the light anti-reflection layer includes: forming the light anti-reflection layer on a side of the color filter apart from the base substrate.

9. The manufacturing method for a color filter substrate according to claim 8, wherein the color filter units include: a red filter unit, a green filter unit and a blue filter unit;

the light anti-reflection layer includes: a red light anti-reflection unit, a green light anti-reflection unit and a blue light anti-reflection unit, and the red light anti-reflection unit corresponds to the red filter unit, the green light anti-reflection unit corresponds to the green filter unit, and the blue light anti-reflection unit corresponds to the blue filter unit.

10. The manufacturing method for a color filter substrate according to claim 9, wherein forming of the light anti-reflection layer includes:

respectively performing three masking processes, so as to form the red light anti-reflection unit on a position corresponding to the red filter unit on the base substrate, form the green light anti-reflection unit on a position corresponding to the green filter unit on the base substrate, and form the blue light anti-reflection unit on a position corresponding to the blue filter unit on the base substrate.

* * * * *